United States Patent [19]
Lowery

[11] Patent Number: 5,365,837
[45] Date of Patent: Nov. 22, 1994

[54] APPARATUS FOR PACKING MATERIAL IN AN OPEN TOP CONTAINER

[76] Inventor: P. Darrell Lowery, Rte. 1, Box 164, Gadsden, Tenn. 38337

[21] Appl. No.: 92,520

[22] Filed: Jul. 16, 1993

[51] Int. Cl.$^5$ ............................................. B30B 15/00
[52] U.S. Cl. ................................. 100/100; 100/226; 100/283
[58] Field of Search ............... 100/65, 100, 226, 228, 100/233, 271, 283

[56] References Cited

U.S. PATENT DOCUMENTS

| | | | |
|---|---|---|---|
| 334,001 | 1/1886 | Dederick | 100/283 X |
| 457,633 | 8/1891 | Dederick | 100/283 X |
| 787,447 | 4/1905 | Hisey et al. | 100/283 X |
| 1,009,719 | 11/1911 | Bradley | 100/283 X |
| 1,106,252 | 8/1914 | Stopple | 100/283 X |
| 1,384,360 | 7/1921 | Stewart | 100/283 X |
| 1,859,272 | 5/1932 | Feik | 100/283 X |
| 2,349,847 | 5/1944 | crumb | 100/283 X |
| 3,402,829 | 9/1968 | Leedahl | |
| 3,691,967 | 9/1972 | Mettetal, Jr. | 100/100 |
| 3,759,171 | 9/1973 | Vocker et al. | 100/233 X |
| 3,797,382 | 3/1974 | Muzzi et al. | 100/100 |
| 4,141,288 | 2/1979 | Henke | 100/35 |
| 4,285,273 | 8/1981 | Dejarnett | 100/233 X |
| 4,426,925 | 1/1984 | Bergmann | 100/65 |
| 5,025,720 | 6/1991 | Bates | 100/226 |

FOREIGN PATENT DOCUMENTS 119728  8/1877  France ................. 100/100

Primary Examiner—Stephen F. Gerrity
Attorney, Agent, or Firm—Walker, McKenzie & Walker

[57] ABSTRACT

An apparatus for packing material in an open top container. The first ends of first and second arm members are pivotally attached to a support member. The opposite ends of a link member are pivotally attached, respectively, to the first and second arm members at points between the opposite ends of the first and second arm members. The upper end of a leg portion of a packer member is pivotally attached to the second ends of the first and second arm members. A foot portion is attached the lower end of the leg portion of the packer member. Urging structure, such as a hydraulic cylinder, causes the first arm member to pivot about the pivotal connection between the first end of the first arm member and the support member so that the second end of the first and second arm members will move through an arc, the link member will move through an arc, the leg portion of the packer member will move through an arc, and the foot portion of the packer member will move substantially vertically.

7 Claims, 2 Drawing Sheets

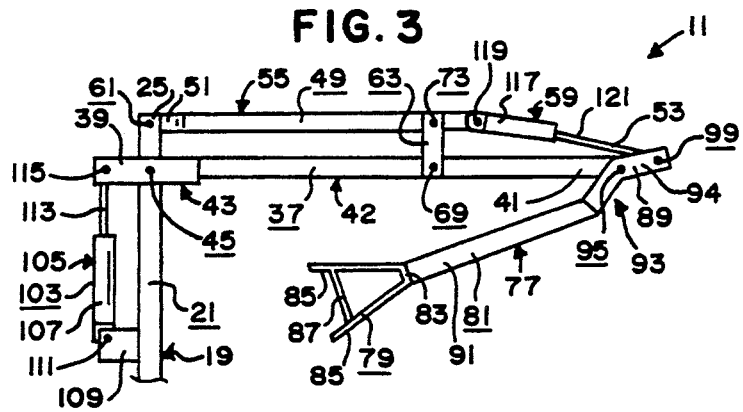
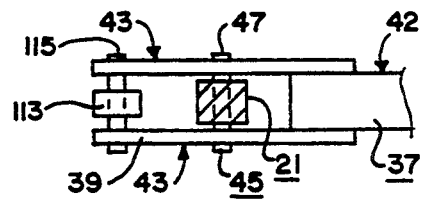
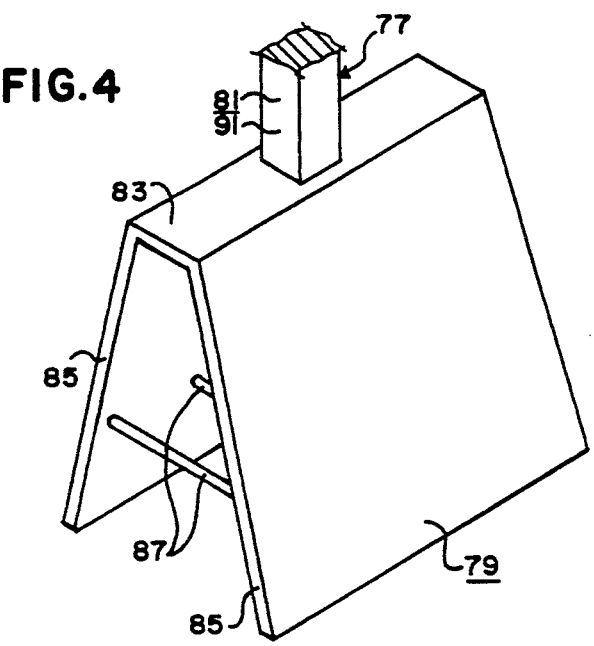
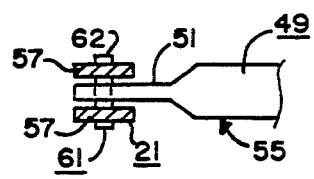
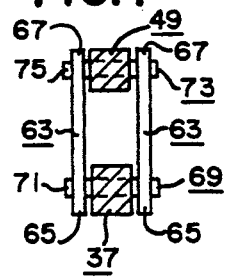
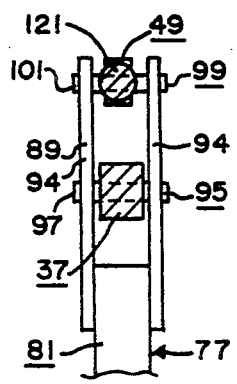

ND5,365,837

APPARATUS FOR PACKING MATERIAL IN AN OPEN TOP CONTAINER

BACKGROUND OF THE INVENTION

1. Field of the Invention

The present invention relates, in general, to packing apparatuses for compressing or packing material such as field cotton in an open top container such as a cotton trailer.

2. Description of the Related Art

Mechanical cotton packers have been used to pack more cotton onto a cotton trailer as well as to press or compress the top layer of cotton in order to keep it from being blown off the trailer while being transported to a cotton gin or the like. A problem that is present in the known prior art mechanical cotton packers is that the operator has to be extremely careful in order not to abuse and/or damage the cotton trailer due to the arcuate or circular movement of the packer leg or foot. That is, when the pressing cycle is activated, the packer foot and leg in the known prior are mechanical cotton packers move in a circular motion and do as much pushing against the sides of the trailer as they do downward against the floor of the trailer. Thus, unless the operator is extremely careful, the sides of the trailers can be easily damaged when using any known prior art mechanical cotton packer.

Bates, U.S. Pat. No. 5,025,720, issued Jun. 25, 1991, discloses a mechanical packing apparatus for packing cotton in a cotton trailer after the cotton has been dumped into the cotton trailer by a cotton picker. The packing apparatus is mounted on a tractor and includes a vertical mast, a cantilevered horizontal boom pivotally attached adjacent its inner end to the vertical mast, a hydraulic cylinder for causing the horizontal boom to pivot about a generally horizontal axis, a packer leg pivotally attached at its upper end to the outer end of the horizontal boom, a packer foot pivotally connected to the lower end of the packer leg, and an L-shaped stabilizing arm having a horizontal arm connected to the packer foot and having a vertical arm connected to the horizontal boom.

A preliminary patentability search has been conducted in class 100, subclasses 65 through 69, and class 414, subclass 25.

Leedahl, U.S. Pat. No. 3,402,829, issued Sep. 24, 1968, discloses a portable stacker for hay and the like. The Leedahl stacker is adapted to be attached to the front end of a tractor and includes a first generally vertical segment, a second segment having one end attached to the upper free end of the first segment through a substantially horizontal pivot, and a third segment having one end attached to the outwardly extending free end of the second segment through a substantially horizontal pivot. A first hydraulic cylinder is connected between a frame mounted in a stationary position on the tractor and the first segment to impart rotary movements about the longitudinal axis thereof. A second hydraulic cylinder is connected between the first and second segments to rotate the second segment about the pivotal connection between the first and second segments along a circular path with respect to the substantially horizontal pivot. A third hydraulic cylinder is connected between the second and third segments for imparting rotary movement of the third segment about the pivotal connection between the second and third segments along a circular path with respect to the substantially horizontal pivot. A pair of tines are attached to the free end of the third segment for engaging hay or the like. Extension or retraction of the second and/or third hydraulic cylinders will thus cause the pair of tines to move along a circular path with respect to the substantially horizontal pivots.

Henke, U.S. Pat. No. 4,141,288, issued Feb. 27, 1979, discloses a hay stacking machine having a platform for supporting a stack of hay. A trough extends from the center of the platform to its outer peripheral edge for accommodating hay. A hay feeding mechanism having reciprocating teeth operates to move hay from the outer edge of the platform generally toward the center thereof. A movable elevator member is located in the center of the platform for moving hay upwardly to build the center of the stack. An annular cage extends around the platform and rotates relative thereto. The cage has a plurality of upright posts. A compression arm is pivotally attached to the top of each upright post through substantially horizontal pivots. A hydraulic cylinder extends between each upright post and a first end of the associated compression arm so that extension and retraction of the hydraulic cylinder will cause the associated compression arm to pivot about the top of the associated upright post, causing the second or free end of the associated compression arm to move along a circular path with respect to the substantially horizontal pivots.

Bergmann, U.S. Pat. No. 4,426,925, issued Jan. 24, 1984, discloses an apparatus for compacting trash, in particular cardboard cartons or the like, in upwardly open containers. The apparatus includes a vertically telescoping post, a pivot arm member mounted to the upper end of the post through a substantially horizontal pivot, and a compacting roll supported from the free end of the pivot arm so that the compacting roll can move along a circular path with respect to the substantially horizontal pivot.

None of the above identified patents or prior art discloses or suggests the present invention. More specifically, none of the above identified patents or prior art discloses or suggests a packing apparatus including a support member; an elongated first arm member having a first end and a second end; first pivot means for pivotally attaching the first end of the first arm member to the support member; an elongated second arm member having a first end and a second end; second pivot means for pivotally attaching the first end of the second arm member to the support member; a link member having a first end and a second end; third pivot means for pivotally attaching the first end of the link member to the first arm member at a point between the first and second ends of the first arm member; fourth pivot means for pivotally attaching the second end of the link member to the second arm member at a point between the first and second ends of the second arm member; a packer member having a foot portion and a leg portion; fifth pivot means for pivotally attaching the leg portion of the packer member to the second end of the first arm member; sixth pivot means for pivotally attaching the leg portion of the packer member to the second end of the second arm member; and urging means for causing the first arm member to pivot about the first pivot means so that the second end of the first and second arm members will move through an arc, the link member will move through an arc, the leg portion of the packer member will move through an arc, and the foot portion of the packer member will move substantially vertically.

SUMMARY OF THE INVENTION

The present invention is directed toward providing an improved packing apparatus for packing material such as cotton or the like in an open top container such as a cotton trailer. A basic concept of the present invention is to provide such a packing apparatus with a cantilevered boom or arm member adapted to be urged about a generally horizontal axis, and with a packing member coupled to the outer end of the boom and having a foot portion adapted to move substantially vertically when the boom is urged about the generally horizontal axis. Thus, a basic concept of the present invention is to provide a mechanical packer that pushes or packs with a vertical motion rather than an arcuate or circular motion.

The packing apparatus of the present invention includes, in general, a support member; an elongated first arm member having a first end and a second end; first pivot means for pivotally attaching the first end of the first arm member to the support member; an elongated second arm member having a first end and a second end; second pivot means for pivotally attaching the first end of the second arm member to the support member; a link member having a first end and a second end; third pivot means for pivotally attaching the first end of the link member to the first arm member at a point between the first and second ends of the first arm member; fourth pivot means for pivotally attaching the second end of the link member to the second arm member at a point between the first and second ends of the second arm member; a packer member having a foot portion and a leg portion; fifth pivot means for pivotally attaching the leg portion of the packer member to the second end of the first arm member; sixth pivot means for pivotally attaching the leg portion of the packer member to the second end of the second arm member; and urging means for causing the first arm member to pivot about the first pivot means so that the second end of the first and second arm members will move through an arc, the link member will move through an arc, the leg portion of the packer member will move through an arc, and the foot portion of the packer member will move substantially vertically. Thus, the first and second arm members, the link member, and the various pivot means coact to form a boom including a parallelogram linkage means for causing the foot portion of the packer member to move substantially vertically when the urging means causes pivotal movement of the first arm member.

BRIEF DESCRIPTION OF THE DRAWINGS

FIG. 3 is a somewhat diagrammatic front elevation view of a portion of the apparatus of the present invention similar to FIG. 1, but showing the apparatus in a third position.

FIG. 4 is a perspective view of the foot member of the apparatus of the present invention.

FIG. 5 is a sectional view substantially as taken on line 5—5 of FIG. 1 with portions thereof broken away or omitted for clarity.

FIG. 6 is a sectional view substantially as taken on line 6—6 of FIG. 1 with portions thereof broken away or omitted for clarity.

FIG. 7 is a sectional view substantially as taken on line 7—7 of FIG. 1 with portions thereof broken away or omitted for clarity.

FIG. 8 is a sectional view substantially as taken on line 8—8 of FIG. 1 with portions thereof broken away or omitted for clarity.

DESCRIPTION OF THE PREFERRED EMBODIMENT

The preferred embodiment of the apparatus of the present invention is shown in FIGS. 1-8 and identified by the numeral 11. The apparatus 11 is designed to pack material such as field cotton 13 or the like in an open container such as a typical cotton trailer 15. However, it should be noted that the apparatus 11 can be used to pack various other materials such as trash, garbage, etc., into various other open top containers such as a hole or ditch in the ground, etc.

Figure 1:
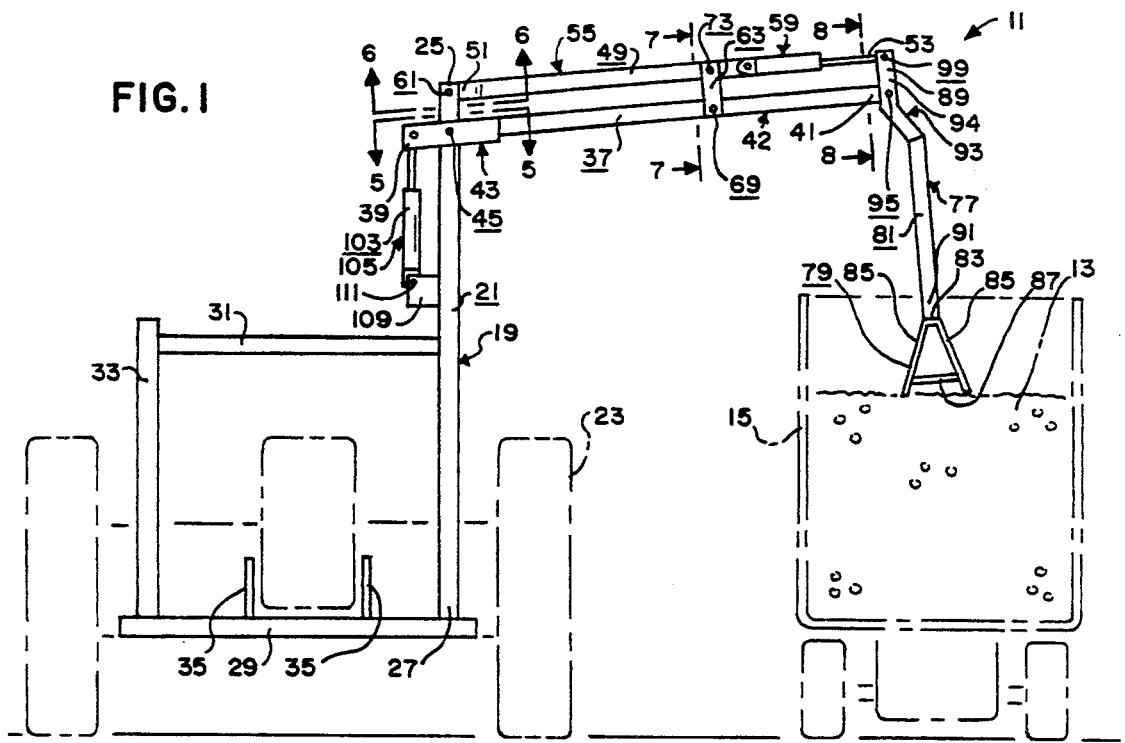
FIG. 1 is a somewhat diagrammatic front elevational view of the apparatus for packing material in an open top container of the present invention shown in combination with a tractor, a cotton trailer, and a quantity of field cotton and with the apparatus in a first position.
Figure 2:
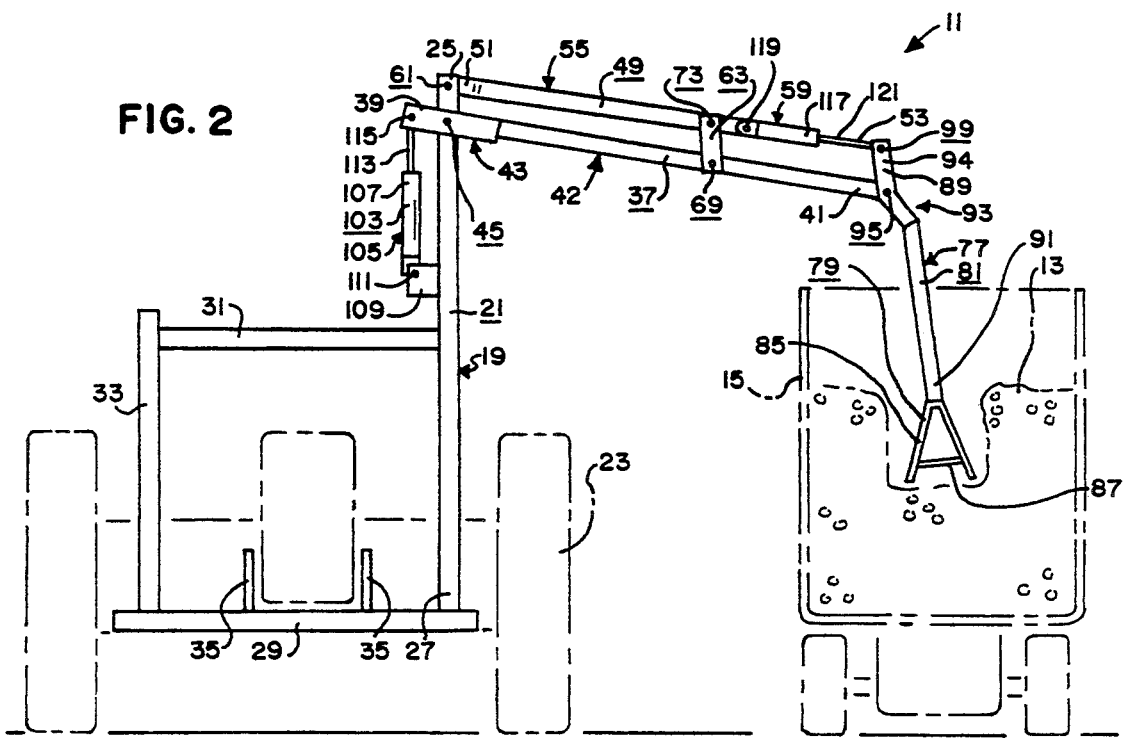
FIG. 2 is a somewhat diagrammatic front elevation view of the apparatus of the present invention similar to FIG. 1, but showing the apparatus in a second position.

The apparatus 11 includes a support member 19. The support member 19 preferably includes a mast 21 for attachment to a tractor 23 or the like. The mast 21 has a first or normally upper end 25 and a second or normally lower end 27. The mast 21 may be attached to the tractor 23 in various specific manners now apparent to those skilled in the art. The support member 19 preferably includes a frame work for securing the mast 21 to the tractor 23. The framework preferably includes a lower arm 29 extending from the second end 27 of the mast 21 beneath the tractor 23, an upper arm 31 extending from a midpoint of the mast 21 across the tractor 23, and a leg 33 joining together the ends of the lower and upper arms 29, 31 opposite the mast 21 as shown in FIGS. 1 and 2. Mounting plates 35 may be attached to the lower arm 29 for allowing the framework to be bolted or otherwise secured to the chassis or the like of the tractor 23. The various parts of the support member 19 may be manufactured out of various materials and in various manners as will now be apparent to those skilled in the art. The mast 21, lower arm 29, upper arm 31, and leg 33 are preferably constructed out of elongated lengths of metal structural members or the like bolted or otherwise fixedly joined together. The mounting plates 35 may be constructed out of metal plate members or the like welded or otherwise fixedly joined to the lower arm 29. The support member 19 may include additional reinforcing elements and the like for increasing the rigidity, stability, and strength, etc., thereof.

The apparatus 11 includes an elongated first arm member or boom 37 having a first end 39 and a second end 41. The first arm member 37 may be manufactured out of various materials and in various manners as will now be apparent to those skilled in the art. Thus, the first arm member 37 preferably includes an elongated body 42 consisting of an elongated length of metal structural member or the like, and a pair of metal plates 43 or the like preferably welded or otherwise fixedly attached to and extending outward from the end of the body 42 to form the first end 39 of the first arm member 37 and to straddle the mast 21 of the support member 19 as clearly shown in FIG. 5.

The apparatus 11 includes first pivot means 45 for pivotally attaching the first end 39 of the first arm member 37 to the support member 19. The first pivot means 45 preferably includes a pivot rod 47 for extending through the plates 43 and the mast 21 to thereby pivotally attach the first end 39 of the first arm member 37 to the mast 21 adjacent the first end 25 thereof as will now be apparent to those skilled in the art.

The apparatus 11 includes an elongated second arm member 49 having a first end 51 and a second end 53. The second arm member 49 may be manufactured out of various materials and in various manners as will now be apparent to those skilled in the art. Thus, the second arm member 49 preferably includes an elongated body 55 consisting of an elongated length of metal structural member or the like. The first end 25 of the mast 21 preferably includes a pair of ear members 57 to straddle the first end 51 of the second arm member 49 as clearly shown in FIG. 6. A cylinder means 59 is preferably attached to the other end of the body 55 to form the second end 53 of the second arm member 49 for reasons which will hereinafter become apparent.

The apparatus 11 includes second pivot means 61 for pivotally attaching the first end 51 of the second arm member 49 to the support member 19. The second pivot means 61 preferably includes a pivot rod 62 for extending through the plates 57 and the mast 21 to thereby pivotally attach the first end 51 of the second arm member 49 to the mast 21 adjacent the first end 25 thereof as will now be apparent to those skilled in the art.

The apparatus 11 includes a link member 63 having a first end 65 and a second end 67. The link member 63 may be manufactured out of various materials and in various manners as will now be apparent to those skilled in the art. Thus, the link member 63 may consist simply of an elongated metal plate or the like. The apparatus 11 preferably includes a pair of identical link members 63 located on opposite sides of the first and second arm members 37, 49 as clearly shown in FIG. 7.

The apparatus 11 includes third pivot means 69 for pivotally attaching the first end 65 of the link member 63 to the first arm member 37. The third pivot means 69 preferably includes a pivot rod 71 for extending through the link member 63 and the body 42 of the first arm member 37 at a point between the first and second ends 39, 41 thereof to thereby pivotally attach the first end 65 of the link member 63 to the body 42 of the first arm member 37 as clearly shown in FIG. 7. When a pair of identical link members 63 are provided, the pivot rod 71 extends through the first ends 65 of both link members 63 to thereby pivotally attach the first ends 65 of both link members 63 to the body 42 of the first arm member 37 as will now be apparent to those skilled in the art.

The apparatus 11 includes fourth pivot means 73 for pivotally attaching the second end 67 of the link mender 63 to the second arm member 49. The fourth pivot means 73 preferably includes a pivot rod 75 for extending through the link member 63 and the body 55 of the second arm member 49 at a point between the first and second ends 51, 53 thereof to thereby pivotally attach the second end 67 of the link member 63 to the body 55 of the second arm member 49 as clearly shown in FIG. 7. When a pair of identical link members 63 are provided, the pivot rod 75 extends through the second ends 67 of both link members 63 to thereby pivotally attach the second ends 67 of both link members 63 to the body 55 of the second arm member 49 as will now be apparent to those skilled in the art.

The apparatus 11 includes a packer member 77 having a foot portion 79 and a leg portion 81.

The foot portion 79 preferably includes a top member 83, a pair of side members 85 extending downwardly and outwardly from the top member, and a plurality of cross or brace members 87 extending between the pair of side members 85 at points adjacent the distal end of each side member 85 (see, in general, FIG. 4). The various parts of the foot portion 79 may be manufactured out of various materials and in various manners as will now be apparent to those skilled in the art. The top member 83 and side members 85 are preferably constructed out of metal plate members or the like welded or otherwise fixedly joined together to form the shape shown in FIG. 4. The cross members 87 may consist of metal bars or the like welded or otherwise fixedly joined at opposite ends to respective side members 85. The specific shape and size of the foot portion 79 may vary as will now be apparent to those skilled in the art.

The leg portion 81 has a first end 89 for attachment to the first and second arm members 37, 49, and a second end 91 for attachment to the foot portion 79. The leg portion 81 preferably has an offset 93 located substantially adjacent the first end 89 thereof as clearly shown in FIGS. 1, 2 and 3. The leg portion 81 may be manufactured out of various materials and in various manners as will now be apparent to those skilled in the art. Thus, for example, the leg portion 81 includes a body bent or otherwise constructed out of a metal structural member with one end thereof forming the second end 91 of the leg portion 81 and being welded or otherwise fixedly attached to the top member 83 of the foot portion 79, etc., as will now be apparent to those skilled in the art. A pair of metal plates 94 or the like are preferably welded or otherwise fixedly attached to and extending outward from the other end of the body to form the first end 89 of the leg portion 81 and to straddle the second end 53 of the second arm member 49 as clearly shown in FIG. 8.

The apparatus 11 includes fifth pivot means 95 for pivotally attaching the leg portion 81 of the packer member 77 to the second end 41 of the first arm member 37. The fifth pivot means 95 preferably includes a pivot rod 97 for extending through the second end 41 of the first arm member 37 and the leg portion 81 of the packer member 77 at a point adjacent the first end 89 thereof to thereby pivotally attach the packer member 77 to the second end 41 of the first arm member 37 as clearly shown in FIG. 8.

The apparatus 11 includes sixth pivot means 99 for pivotally attaching the leg portion 81 of the packer member 77 to the second end 53 of the second arm member 49. The sixth pivot means 99 preferably includes a pivot rod 101 four extending through the second end 53 of the second arm member 49 and the first end 89 of the leg portion 81 of the packer member 77 to thereby pivotally attach the packer member 77 to the second end 53 of the second arm member 49 as clearly shown in FIG. 8.

The apparatus 11 includes urging means 103 for causing the first arm member 37 to pivot about the first pivot means 45 so that the second ends 41, 53 of the first and second arm members 37, 49 will move through an arc, the link member 63 will move through an arc, the leg portion 81 of the packer member 77 will move through an arc, and the foot portion 79 of the packer member 77 will move substantially vertically. This movement is due to the parallelogram linkage created by the first and second arm members 37, 49, the link member 63, and the various pivot means 45, 61, 69, 73, 95, 99. That is, the first and second arm members 49, the link member 63, and the various pivot means 45, 61, 69, 73, 95, 99 coact to form a boom including a parallelogram linkage means for causing the foot portion 79 of the packer member 77 to move substantially vertically when the urging means 103 causes pivotal movement of the first arm member 37 as will now be apparent to those skilled in the art. The urging means 103 preferably includes a cylinder means 105 for causing the first arm member 37 pivot about the first pivot means 45.

The cylinder means 59 of the second arm member 49 and the cylinder means 105 of the urging means 103 preferably include or consist of hydraulic cylinders for coupling to the typical hydraulic circuit means or system of the tractor 23 so that the operator of the tractor 23 can extend and retract the cylinder means 59, 105 when desired.

The cylinder means 105 preferably includes a cylinder portion 107 pivotally attached to the mast 21 by ear members 109 and a pivot rod 111 or the like, and preferably includes a rod member 113 pivotally attached to the first end 39 of the first arm 37 by a pivot rod 115 or the like a spaced distance from the first pivot means 45 as will now be apparent to those skilled in the art. Likewise, the cylinder means 59 preferably includes a cylinder portion 117 pivotally attached to the end of the body 55 of the second arm member 49 opposite the first end 51 of the second arm member 49 by a pivot rod 119 or the like, and preferably includes a rod member 121 pivotally attached to the first end 89 of the leg portion 81 of the packer member 77 by the pivot rod 101 of the sixth pivot means 99 as will now be apparent to those skilled in the art.

Extension and retraction of the cylinder means 59 will cause the packer member 77 to rotate about the fifth pivot means 95 between a transport position as shown in FIG. 13 and a use position as shown in FIGS. 1 and 2 and as will now be apparent to those skilled in the art. Extension and retraction of the cylinder means 105 will cause the first arm member 37 to pivot about first pivot means 45 and, thereby, cause the foot portion 79 of the packer member 77 to move substantially vertically between a raised position as shown in FIG. 1 and a lowered position as shown in FIG. 2 when the packer member 77 is in the use position as will now be apparent to those skilled in the art.

The operation and use of the apparatus 11 is quite simple. Once the support member 19 has been secured to the tractor 23 and the cylinder means 59, 105 coupled to the hydraulic system of the tractor 23, the tractor 23 can be driven to the field where field cotton 13 is being dumped into a cotton trailer 15 by one or more cotton pickers or the like. The apparatus 11 should be transported by the tractor 23 with the packer member 77 in the transport position as shown in FIG. 3. When the tractor 23 reaches the field, the cylinder means 59 is retracted to move the packer member 77 to the use position as shown in FIGS. 1 and 2. The tractor 23 can then be positioned so that the foot portion 79 of the packer member 77 is positioned directly over the portion of the field cotton 13 in the cotton trailer 15 to be compressed. The tractor operator then merely extends the cylinder means 105 to cause the first arm member 37 to pivot in a clockwise direction as viewed in FIGS. 1 and 2 so that the foot portion 79 will move substantially vertically downward from the position shown in FIG. 1 to the position shown in FIG. 2. When the above step is completed, the tractor 23 can be moved back and forth relative to the trailer 15 so that cotton 13 in all areas of the trailer 15 can be packed or compressed.

Although the present invention has been described and illustrated with respect to a preferred embodiment and a preferred use therefor, it is not to be so limited since modifications and changes can be made therein which are within the full intended scope of the invention.

I claim:

1. An apparatus for packing material in an open top container, said apparatus comprising:
   (a) a support member;
   (b) an elongated first arm member having a first end and a second end;
   (c) first pivot means for pivotally attaching said first end of said first arm member to said support member;
   (d) an elongated second arm member having a first end and a second end:
   (e) second pivot means for pivotally attaching said first end of said second arm member to said support member;
   (f) a link member having a first end and a second end;
   (g) third pivot means for pivotally attaching said first end of said link member to said first arm member at a point between said first and second ends of said first arm member;
   (h) fourth pivot means for pivotally attaching said second end of said link member to said second arm member at a point between said first and second ends of said second arm member;
   (i) a packer member having a foot portion and a leg portion;
   (j) fifth pivot means for pivotally attaching said leg portion of said packer member to said second end of said first arm member;
   (k) sixth pivot means for pivotally attaching said leg portion of said packer member to said second end of said second arm member; and
   (l) urging means for causing said first arm member to pivot about said first pivot means so that said second end of said first and second arm members will move through an arc, said link member will move through an arc, said leg portion of said packer member will move through an arc, and said foot portion of said packer member will move substantially vertically;
   said second arm member including means for causing rotation of said packer means about said fifth pivot means between a transport position and a use position.

2. An apparatus for packing material in an open top container, said apparatus comprising:
   (a) a support member;
   (b) an elongated first arm member having a first end and a second end;
   (c) first pivot means for pivotally attaching said first end of said first arm member to said support member;
   (d) an elongated second arm member having a first end and a second end;
   (e) second pivot means for pivotally attaching said first end of said second arm member to said support member;
   (f) a link member having a first end and a second end;

(g) third pivot means for pivotally attaching said first end of said link member to said first arm member at a point between said first and second ends of said first arm member;

(h) fourth pivot means for pivotally attaching said second end of said link member to said second arm member at a point between said first and second ends of said second arm member;

(i) a packer member having a foot portion and a leg portion;

(j) fifth pivot means for pivotally attaching said leg portion of said packer member to said second end of said first arm member;

(k) sixth pivot means for pivotally attaching said leg portion of said packer member to said second end of said second arm member;

(l) urging means for causing said first arm member to pivot about said first pivot means so that said second end of said first and second arm members will move through an arc, said link member will move through an arc, said leg portion of said packer member will move through an arc, and said foot portion of said packer member will move substantially vertically; and (m) said second arm member including a cylinder means for causing extension and retraction of said second end of said second arm member and for causing rotation of said packer means about said fifth pivot means between a transport position and a use position.

3. The apparatus of claim 2 in which said urging means includes a cylinder means for causing said first arm member to pivot about said first pivot means.

4. The apparatus of claim 3 in which said cylinder means of said second arm member and said cylinder means of said urging means include hydraulic cylinders.

5. The apparatus of claim 4 in which is included a tractor, and in which said support member includes a frame attached to said tractor.

6. The apparatus of claim 5 in which said tractor includes hydraulic circuit means, and in which said hydraulic cylinders are controlled by said hydraulic circuit means of said tractor.

7. The apparatus of claim 3 in which said leg portion of said packer member has an offset.

* * * * *